(12) United States Patent
Conte et al.

(10) Patent No.: US 11,033,145 B2
(45) Date of Patent: Jun. 15, 2021

(54) OVEN FOR COOKING PRODUCTS

(71) Applicants: VENIX S.R.L., Treviso (IT);
CONBEQ INDUSTRIAL EUROPE S.L., Barcelona (ES)

(72) Inventors: Roberto Conte, Padua (IT); Juan Carlos Domenech, Barcelona (ES)

(73) Assignees: VENIX S.R.L., Treviso (IT);
CONBEQ INDUSTRIAL EUROPE S.L., Barcelona (ES)

( * ) Notice: Subject to any disclaimer, the term of this patent is extended or adjusted under 35 U.S.C. 154(b) by 563 days.

(21) Appl. No.: 15/790,663

(22) Filed: Oct. 23, 2017

(65) Prior Publication Data

US 2018/0125294 A1    May 10, 2018

(30) Foreign Application Priority Data

Oct. 21, 2016    (IT) .................... 102016000106475

(51) Int. Cl.
*A47J 37/06* (2006.01)
*F24C 15/32* (2006.01)
*A47J 37/04* (2006.01)

(52) U.S. Cl.
CPC ......... *A47J 37/0641* (2013.01); *A47J 37/047* (2013.01); *F24C 15/322* (2013.01)

(58) Field of Classification Search
CPC .... A47J 37/0641; A47J 37/047; F24C 15/322
USPC .......................................... 99/325, 331, 334
See application file for complete search history.

(56) References Cited

U.S. PATENT DOCUMENTS

| 2,882,812 A | * | 4/1959 | Greenwald | A47J 37/049 99/427 |
| 3,168,642 A | * | 2/1965 | Savio | F24C 7/00 219/400 |
| 4,155,294 A | * | 5/1979 | Langhammer | F24C 15/325 219/389 |
| 4,295,419 A | | 10/1981 | Langhammer | |
| 4,442,763 A | * | 4/1984 | Beller | A47J 37/0745 126/9 B |
| 4,581,989 A | * | 4/1986 | Swartley | A47J 37/0623 126/21 A |
| 4,622,231 A | * | 11/1986 | Swartley | A47J 37/0623 426/438 |
| 4,865,864 A | * | 9/1989 | Rijswijck | A47J 37/047 426/520 |
| 5,134,927 A | * | 8/1992 | McCarthy, III | A47J 37/047 126/21 A |
| 5,193,444 A | * | 3/1993 | Bar-Sheshet | A21B 1/26 126/21 A |
| 5,325,767 A | * | 7/1994 | Beller | A47J 37/049 99/421 R |

(Continued)

FOREIGN PATENT DOCUMENTS

| GB | 2119922 | 11/1983 |
| WO | 2014/154775 | 10/2014 |

OTHER PUBLICATIONS

International Search Report for IT201600106475 dated Jun. 1, 2017 (2 pages).

*Primary Examiner* — Jimmy Chou
(74) *Attorney, Agent, or Firm* — Tutunjian & Bitetto, P.C.

(57) ABSTRACT

The present invention regards an oven for cooking products, particularly foods, if desired for frying or cooking frozen products or fresh, breaded products.

21 Claims, 6 Drawing Sheets

(56) References Cited

U.S. PATENT DOCUMENTS

| | | | | |
|---|---|---|---|---|
| 5,497,697 A * | 3/1996 | Promny | A47J 37/047 | 99/394 |
| 5,545,874 A * | 8/1996 | Hansson | A47J 37/047 | 126/21 A |
| 5,613,774 A * | 3/1997 | Chandra | A47J 27/04 | 366/228 |
| 5,632,098 A * | 5/1997 | Finch | A23N 12/10 | 34/63 |
| 5,676,870 A * | 10/1997 | Wassman | F24C 15/325 | 126/21 A |
| 5,780,815 A * | 7/1998 | Mestnik | A47J 36/38 | 219/400 |
| 5,994,672 A * | 11/1999 | Mestnik | A47J 36/38 | 219/400 |
| 6,079,319 A * | 6/2000 | Doria | A47J 37/047 | 99/331 |
| 6,138,553 A * | 10/2000 | Toebben | A47J 37/042 | 126/25 AA |
| 6,173,645 B1 * | 1/2001 | Backus | A47J 37/041 | 220/326 |
| 6,272,975 B1 * | 8/2001 | Usherovich | A47J 37/047 | 99/331 |
| 6,347,577 B1 * | 2/2002 | Harneit | A47J 37/047 | 99/419 |
| 6,418,835 B1 * | 7/2002 | Lin | A47J 37/042 | 219/400 |
| 6,561,083 B2 * | 5/2003 | Hsu | A47J 37/041 | 99/421 H |
| 7,514,651 B2 * | 4/2009 | Popeil | A47J 37/042 | 219/392 |
| 7,921,768 B2 * | 4/2011 | Fernandez | A47J 37/042 | 99/419 |
| D650,228 S * | 12/2011 | Gardner | D7/354 | |
| 8,890,037 B2 * | 11/2014 | Best | A47J 37/0652 | 219/411 |
| 8,915,180 B2 * | 12/2014 | Jacob | A47J 37/046 | 99/450 |
| 9,155,422 B1 * | 10/2015 | Wohld | F16M 11/22 | |
| D771,994 S * | 11/2016 | Zemel | D7/338 | |
| 9,833,108 B2 * | 12/2017 | Kazerouni | A47J 37/043 | |
| 10,383,477 B2 * | 8/2019 | Payen | A47J 37/0641 | |
| 2002/0174779 A1 * | 11/2002 | Friedl | A47J 37/042 | 99/421 H |
| 2004/0055477 A1 * | 3/2004 | Swank | A21B 3/02 | 99/419 |
| 2005/0022676 A1 * | 2/2005 | Swank | A21B 3/02 | 99/419 |
| 2006/0225580 A1 * | 10/2006 | Fernandez | A47J 37/041 | 99/419 |
| 2008/0044537 A1 * | 2/2008 | Manuel | F24C 15/16 | 426/523 |
| 2008/0063773 A1 * | 3/2008 | Maguire | A47J 27/04 | 426/523 |
| 2008/0121117 A1 * | 5/2008 | Best | A47J 37/0718 | 99/339 |
| 2009/0188396 A1 * | 7/2009 | Hofmann | G01K 1/024 | 99/342 |
| 2009/0277339 A1 * | 11/2009 | Andrade | A47J 37/047 | 99/427 |
| 2011/0097468 A1 * | 4/2011 | Driscoll | A47J 37/0786 | 426/519 |
| 2011/0142998 A1 * | 6/2011 | Johncock | A47J 37/041 | 426/233 |
| 2012/0204732 A1 * | 8/2012 | Dondurur | A47J 37/041 | 99/427 |
| 2013/0112087 A1 * | 5/2013 | Hassell | A47J 37/108 | 99/421 H |
| 2014/0216271 A1 * | 8/2014 | Arling | A47J 37/041 | 99/421 H |
| 2016/0051085 A1 * | 2/2016 | Dalcq | A47J 37/0641 | 99/443 R |
| 2016/0309956 A1 * | 10/2016 | Glucksman | A47J 37/041 | |
| 2020/0029731 A1 * | 1/2020 | Hunt | A47J 27/002 | |

\* cited by examiner

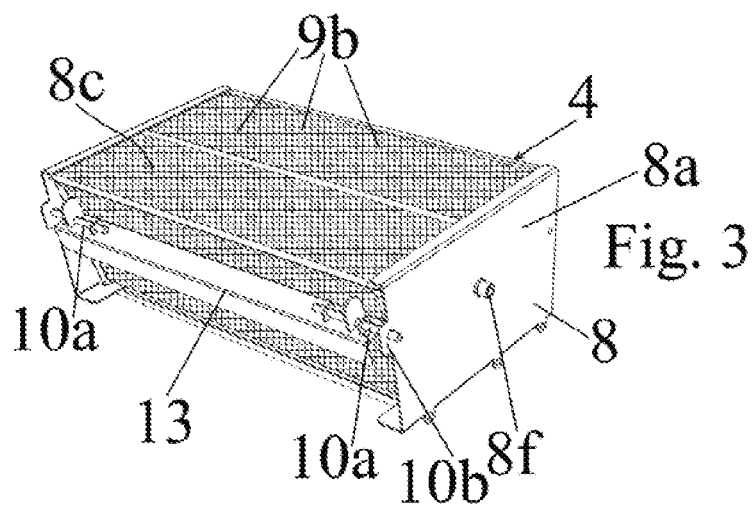
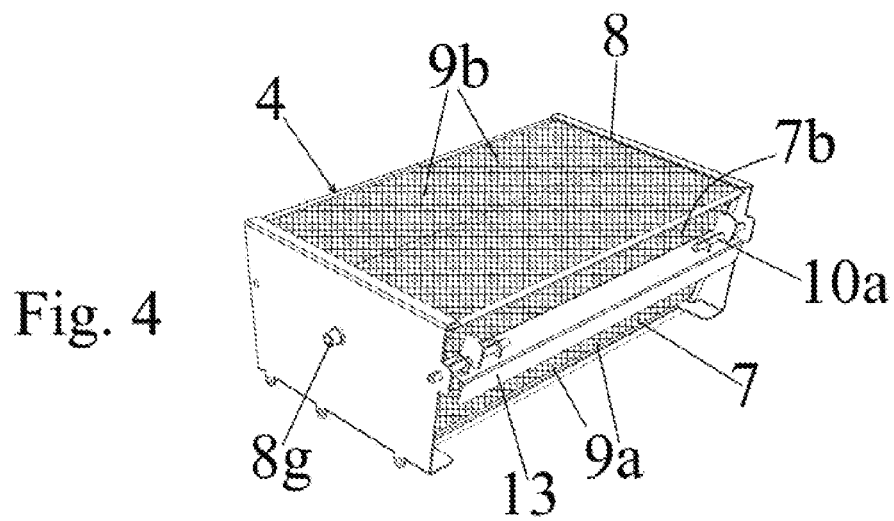
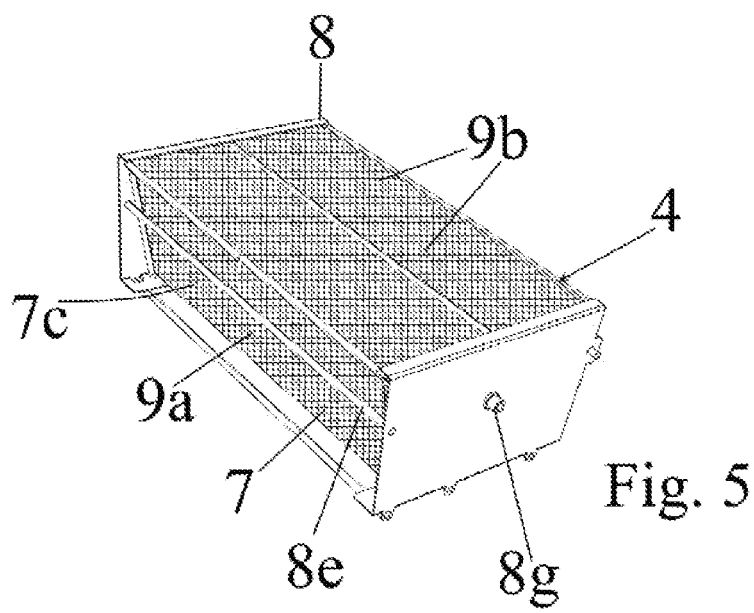

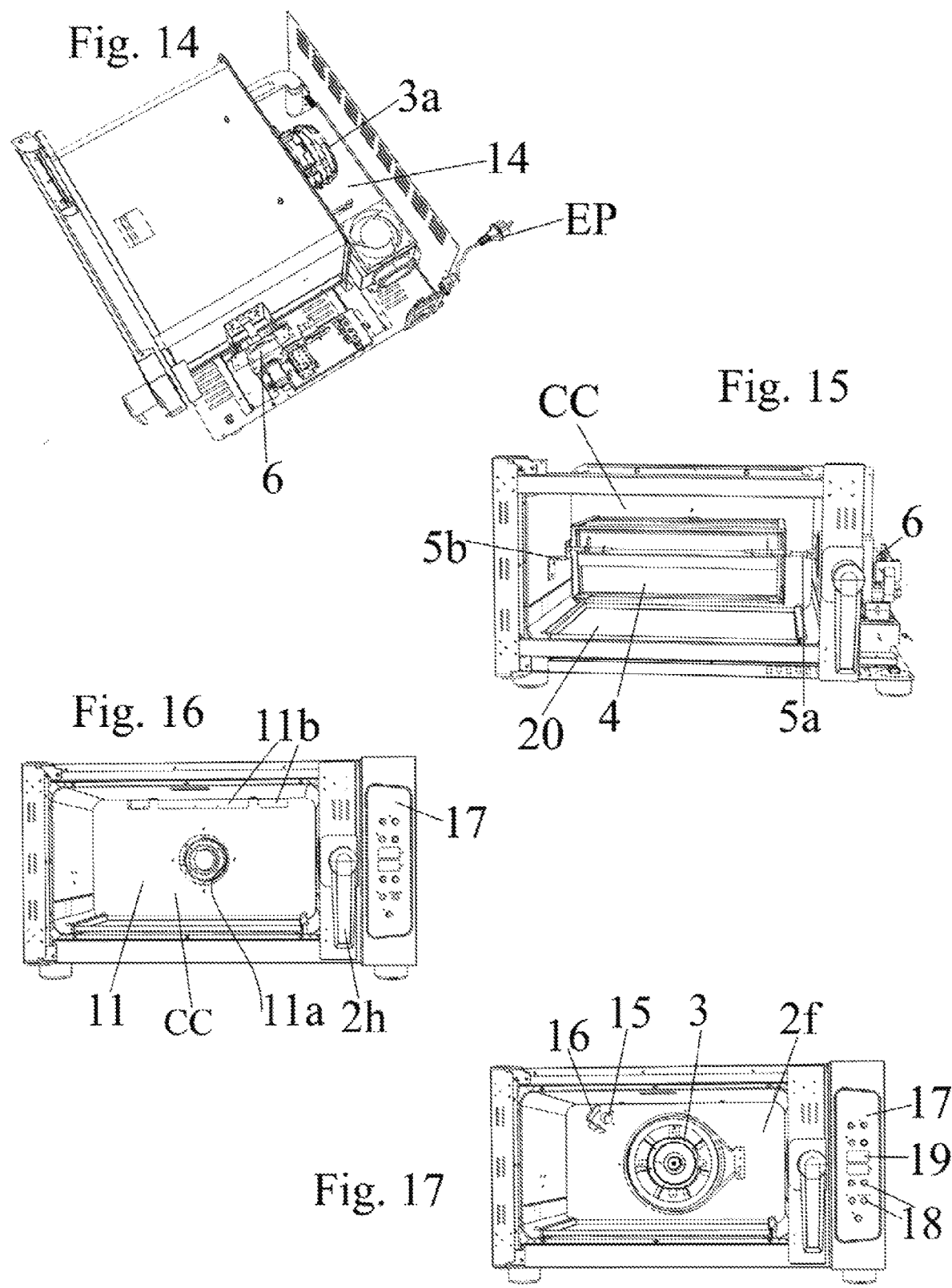

OVEN FOR COOKING PRODUCTS

TECHNICAL FIELD OF THE INVENTION

The present invention regards an oven for cooking products, particularly foods, if desired an oven for frying or cooking frozen products, precooked products or fresh, breaded products, such as vegetables covered with batter, which are normally fried or cooked before being served, e.g. French fries or chicken morsels.

DESCRIPTION OF RELATED ART

In the past, frozen foods which must be fried before being served have been fried in oil, thus sustaining a first cooking before being frozen.

For the cooking of frozen foods, equipment is normally used which provides for a chamber partially filled with oil into which a basket full of frozen products is inserted.

Such equipment pieces involve the use of hot oil, which—especially if subjected to cooking—can compromise the health of the users.

In addition, conventional equipment is used for cooking different products during subsequent steps and, in such case, the oil used for one product, e.g. meat, is subsequently in contact with a different food, such as fish, contaminating it with the odor and taste of the product that was previously cooked.

U.S. Pat. Nos. 4,155,294A, 4,295,419A, WO2014154775A1, U.S. Pat. No. 4,865,864A and GB2119922A describe solutions according to the state of the art.

SUMMARY OF THE INVENTION

One object of the present invention is to provide a new cooking oven, in particular for cooking foods, if desired an oven for frying frozen products or fresh, breaded products, such as vegetables coated with batter.

Another object of the present invention is to provide a new oven capable of cooking the products—in particular foods—in a quick and uniform manner.

Another object of the present invention is to provide an oven in which it is possible to achieve different cooking modes and pass from one to the other in a simple and quick manner.

Another object of the present invention is to provide an oven which allows a cooking of foods such to not alter the quality and healthiness of the latter.

In accordance with one aspect of the invention, an oven is provided according to the present application.

The present application refers to preferred and advantageous embodiments of the invention.

BRIEF DESCRIPTION OF THE DRAWINGS

Other characteristics and advantages of the invention will be more evident from the description of one embodiment of an oven, illustrated by way of example in the enclosed drawings in which:

FIGS. 3 to 5 are perspective views, respectively from the front and from the rear of a basket assembly of the oven of FIG. 1;

FIGS. 14 to 17 are respective views of the oven of FIG. 1 with parts removed;

In the set of drawings, equivalent parts or components are marked by the same reference numbers.

DETAILED DESCRIPTION OF THE INVENTION

Figure 1:
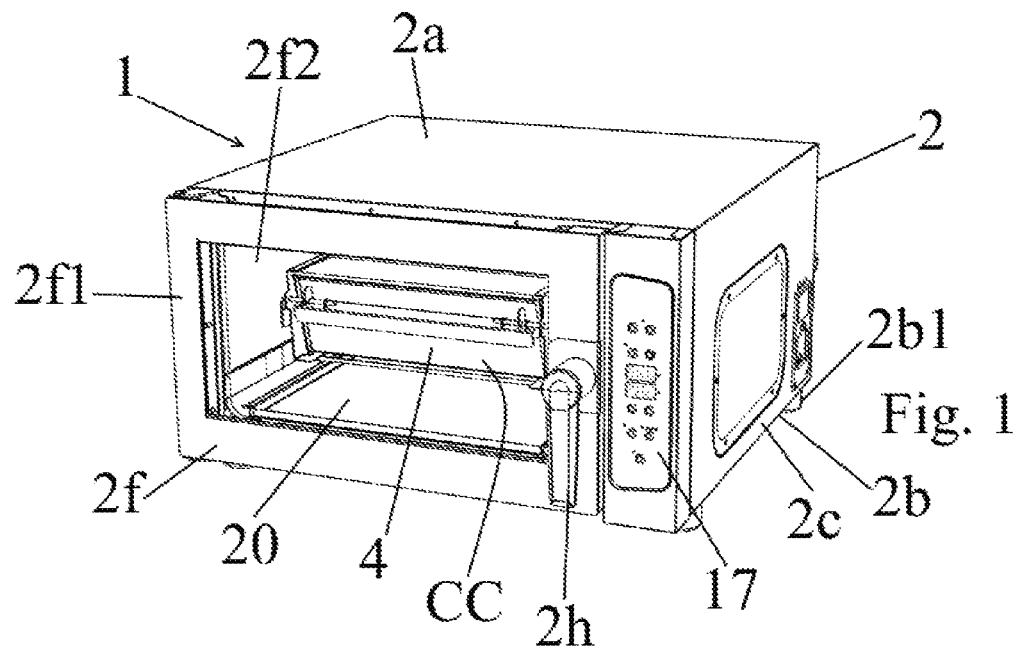
FIGS. 1 and 2 are perspective views, respectively frontal and rear, of an oven according to the present invention.
Figure 2:
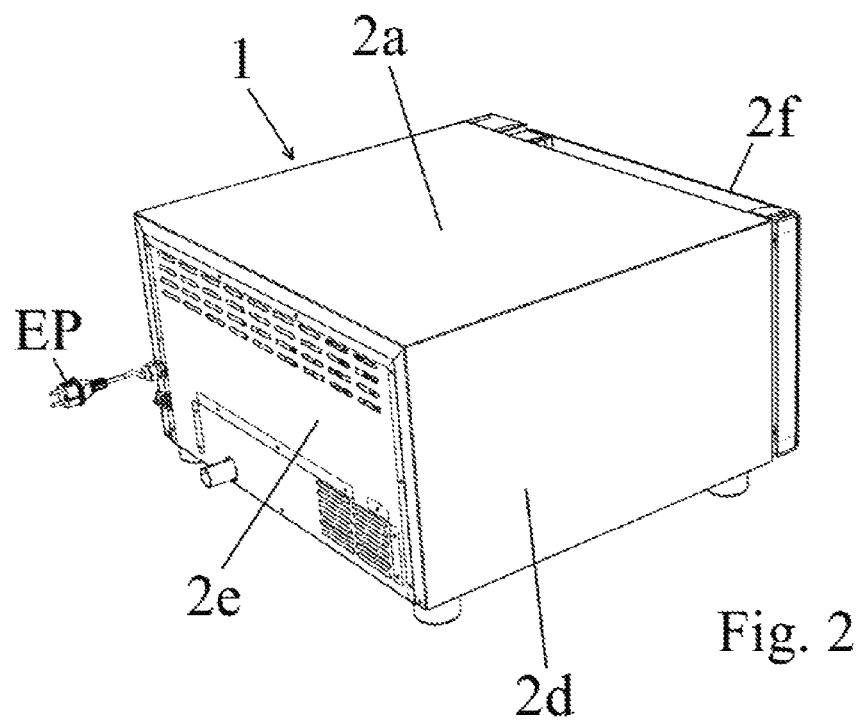
Figure 6:
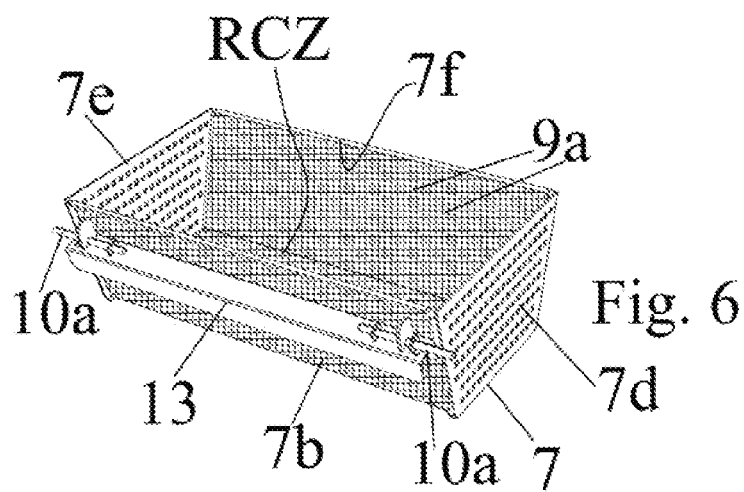
FIGS. 6 to 9 are views, respectively, perspective from the front and from a side, lateral, frontal and perspective from the front and from another side of a containing body of the oven of FIG. 1.
Figure 7:
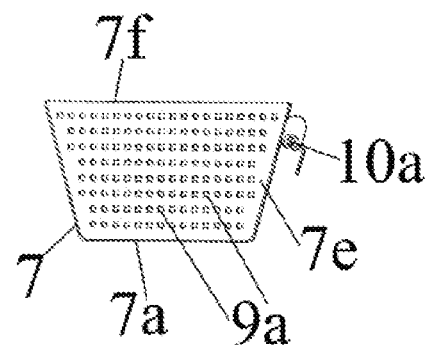
Figure 8:
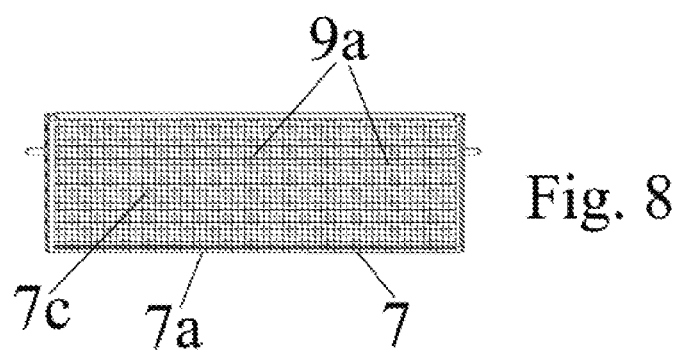
Figure 9:
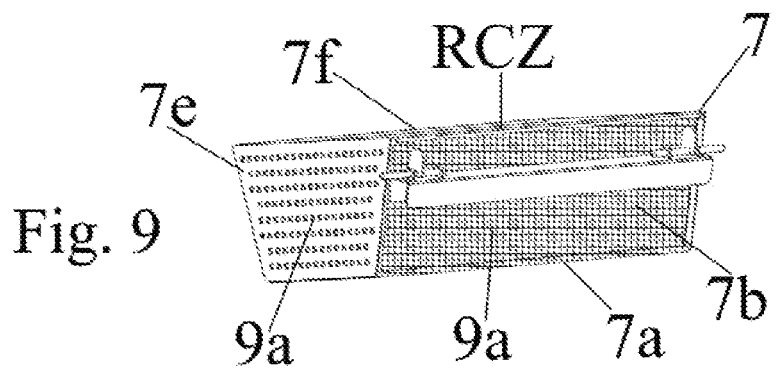
Figure 10:
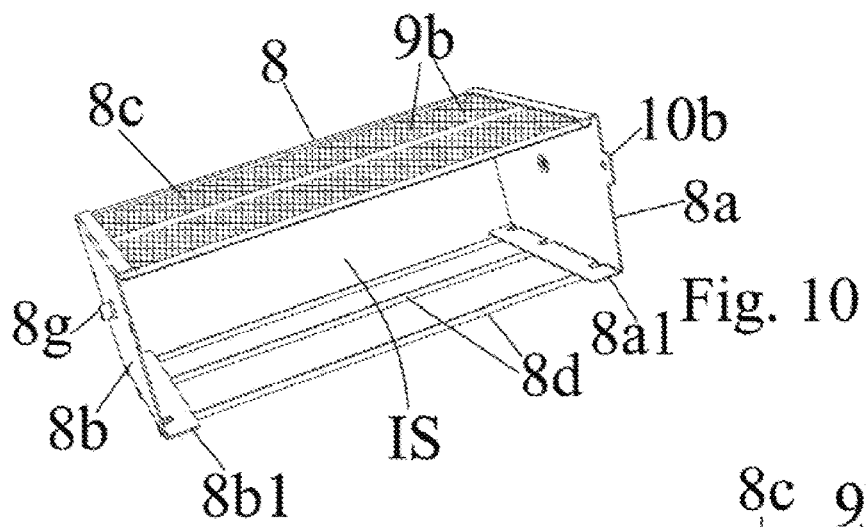
FIGS. 10 to 13 are views, respectively, perspective from the front and from a side, perspective from the front and from another side, lateral and frontal of an opening/closing component of the oven of FIG. 1.
Figure 11:
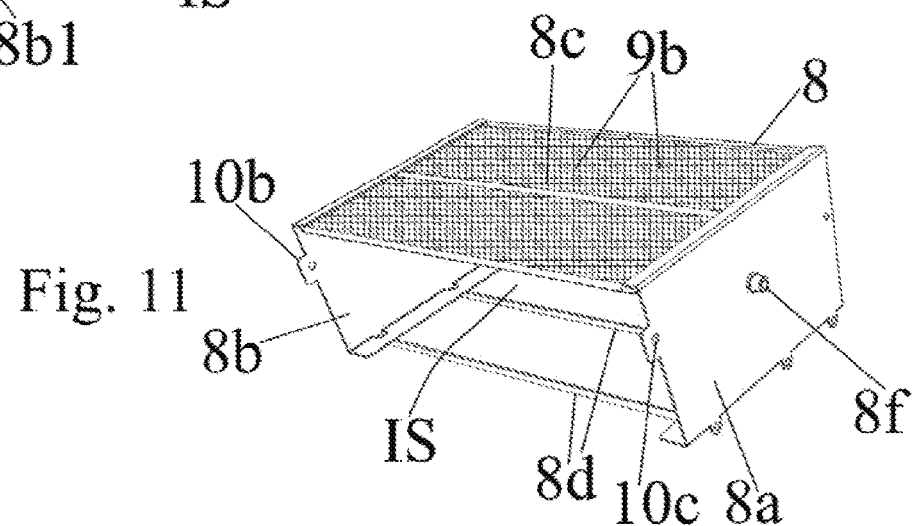
Figure 12:
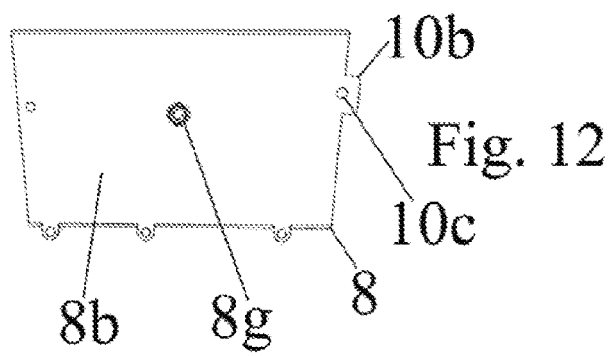
Figure 13:
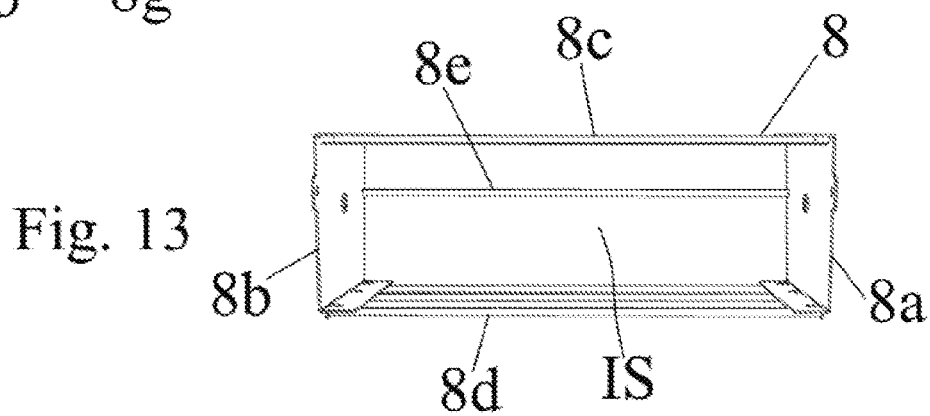

With reference to the enclosed figures, an oven 1 is illustrated according to the present invention for cooking products, particularly foods, if desired for frying or cooking frozen products, precooked products or fresh, breaded products, comprising a containing shell or frame 2 delimiting at least one cooking chamber CC.

The containing frame 2 has a door 2f that can be moved so as to allow the opening or sealing closure of the cooking chamber CC. The door 2f is not a component of the basket assembly 4, while the latter is entirely contained within the cooking chamber CC delimited by the frame 2.

The frame 2 can in particular have a top wall 2a, a base wall 2b, lateral walls, e.g. two 2c, 2d, as well as a rear wall 2e and a front door 2f connected or hinged to the end, front during use, of a lateral wall 2c or 2d or of the top wall 2a or base wall 2b. The base wall 2b can be mounted on feet 2b1.

The front door 2f can also have a frame portion 2f1, e.g. made of metal, and one or a pair of panes or three panes or a double glazing 2f2 mounted in the frame portion 2f1 so as to define a zone for inspection from outside the cooking chamber CC. Clearly, the front door 2f is movable so as to allow the opening and sealing closure of the cooking chamber CC. On such matter, gaskets can be provided for ensuring the seal at the zone of engagement of the front door 2f with the other walls 2a, 2b, 2c and 2d of the oven.

In order to open the front door 2f, a grip 2h or an opening button can be provided.

The oven 1 then comprises means for the introduction and, if desired, circulation 3 of a hot fluid or air within the cooking chamber CC for heating and cooking products, e.g. a fan 3 (see in particular FIG. 17), if desired radial or axial, which can be mounted on the rear wall of the cooking chamber CC, for example as will also be described hereinbelow, as well as motor means 3a, if desired an electric motor, for the actuation of the fan 3. According to a less preferable variant, the operating means comprise a manual actuation crank.

The fan 3 can have horizontal rotation axis, e.g. in front-rear direction or from one side to the other.

As can be understood, the oven 1 could comprise a heating system for the suctioned air or for the air to be suctioned, such as an electrical resistance, halogen lamps, vapor-heated tubes or other systems arranged on the suction or on the delivery of the fan 3.

Preferably, an oven 1 according to the present invention is set to cook products in the absence of oil or hot liquid, i.e. without embedding the products to be cooked in an oil bath or hot liquid.

The oven 1 can also include at least one basket assembly 4 for containing products or foods to be cooked, as well as means for the pivoting or angular displacement 5a, 5b (see FIG. 15) of the basket assembly 4 within the cooking chamber CC and operating means 6 (see FIGS. 14 and 15), e.g. an electric motor, set to drive or allow the driving in rotation or angular displacement of the basket assembly 4 engaged with the pivot or angular displacement means 5a, 5b.

The pivot or angular displacement means 5a, 5b can comprise pins or small shafts or brackets or hooks 5a, 5b set to rotatably engage respective sections of the basket 4. More particularly, a first means can be provided for the pivoting or the angular displacement 5a drivable in rotation by means of the operating means 6, if desired connected or fixed to a drive shaft driven by an operating means 6, and a second means can be provided for the pivoting or the angular displacement 5b supported fixed or rotatably idle by the frame 2 inside the cooking chamber CC and, if desired, substantially aligned with the first means for the pivoting or the angular displacement 5a.

The basket assembly 4 is then made to rotate or angularly moved so as to mix the foods at its interior, in order to optimize the cooking.

The basket assembly 4 delimits a zone for housing and containing RCZ products to be cooked and it is also set to maintain the products within the housing and containing zone RCZ during the pivoting or angular displacement thereof by the operating means 6, hence even for a pivoting or rotation of 360° or for multiple successive rotations of 360° of the basket assembly 4.

Advantageously, the basket assembly 4 comprises at least one containing body 7 and at least one opening/closing component 8 of the containing body 7, and such opening/closing component 8 is set to delimit, together with the containing body 7, the housing and containing zone RCZ for products to be cooked so as to maintain the products within the housing and containing zone RCZ during their pivoting or angular displacement by the operating means 6.

If desired, the containing body 7—directly or by means of or by interposition of the opening/closing component 8—is removably engageable with the pivot or angular displacement means 5a, 5b, so as to be alternatively positionable:

in at least one first position (see FIG. 1) in which the containing body 7 is engaged with or by the pivot or angular displacement means 5a, 5b and is arranged within the cooking chamber CC for cooking said products, and in at least one second position (see FIGS. 6 to 9) in which the containing body 7 is disengaged from the pivot or angular displacement means 5a, 5b and is arranged outside the cooking chamber CC for loading the containing body 7 with products to be cooked and/or for emptying the containing body 7 of cooked products.

According to the non-limiting embodiment illustrated in the figures, in the first position the containing body 7 is engaged and inserted in the opening/closing component 8, while in the second position the containing body 7 is disengaged and disconnected from the opening/closing component 8. In the passage of the containing body from first to the second position, the opening/closing component can also remain connected and in engagement with the pivot or angular displacement means 5a, 5b and inside the cooking chamber CC.

In addition, the containing body 7 and/or the opening/closing component 8 delimit at least one inflow opening 9a, 9b set to allow the delivery to the interior of the housing and containing zone RCZ of a hot fluid or air introduced in the cooking chamber CC by the introduction means 3.

Advantageously, the inflow openings 9a, 9b have dimensions variable between 2 mm and 2 cm, preferably between 2 and 6 mm or between 3 and 5 mm.

On such matter, the containing body 7 and/or the opening/closing component 8 comprise at least one wall delimiting a plurality of inflow openings 9a, 9b.

More particularly, the containing body 7 can have a bottom wall 7a, bottom in rest condition, as well as one or a plurality of perimeter walls 7b-7e projecting upward from the bottom wall 7a so as to define a lateral zone or delimitation frame together with the bottom wall 7a of the housing and containing zone RCZ.

In the present patent application, by rest condition it is intended the condition in which the containing body 7 has a horizontal or substantial horizontal bottom surface 7a at a lower level than the other walls of the containing body or in any case in which the containing body 7 is extractable from the cooking chamber CC.

The perimeter wall(s) 7b-7e projecting upward from the bottom wall 7a or better yet the free edge or the end or the end section thereof distal from the bottom wall 7a defines a filling or emptying opening 7f of the housing and containing zone RCZ.

With regard more particularly to the walls projecting upward from the bottom wall 7a, two main walls 7b, 7c can be provided that include a front or frontal wall 7b, a rear 7c as well as two bridge connection flanks 7d, 7e of the main walls 7b, 7c.

The containing body 7 or better yet the housing and containing zone RCZ can have a longitudinal or cross section configured as a regular or irregular trapezoid or polygon or in any case such to have acute internal angles, e.g. between 30° and 60° delimited between the bottom wall 7a and one or more of the perimeter walls and/or between adjacent perimeter walls.

Preferably, the bottom wall 7a and/or the main walls 7b, 7c and/or the flanks 7d, 7e can be configured as a regular or irregular trapezoid or polygon or with three, five, six or more sides and have edges constrained or welded at respective edges of the adjacent walls of the containing body 7.

Alternatively, the bottom wall 7a and/or the main walls 7b, 7c and/or the flanks 7d, 7e could also be configured as a square or rectangle, but be constrained to the adjacent walls of the containing body so as to delimit one or more acute angles inside, i.e. in the housing and containing zone RCZ.

In addition, the bottom wall 7a and/or the main walls 7b, 7c and/or the flanks 7d, 7e could also be constrained in an adjustable or variable manner, so as to allow varying the tilt between the perimeter walls of the containing body 7 and hence, when the desired configuration is obtained, locking them by means of a belt or tie.

In the housing and containing zone RCZ, inserts or deflectors could also be provided such to increasing the mixing of the products during the rotation or angular displacement of the basket assembly 4.

Naturally, the containing body 7 could also comprise five or six perimeter walls projecting upward from the bottom wall 7a.

According to a less preferred variant, the walls of the containing body delimit right angles with respect to each other.

Clearly, the walls 7a-7e are connected together or welded together, without there being interspaces between them, clearly apart from the filling and emptying opening 7f, so as to prevent the fall of products from the housing and containing zone RCZ.

With reference to the non-limiting embodiment illustrated in the figure, the flanks 7d, 7e are configured as a trapezoid, if desired isosceles, with obtuse angles between adjacent sides of the flanks 7d, 7e at the bottom wall 7a and acute angles at the respective free edge. In such case, the main walls 7b, 7c are configured as a rectangle with short sides of size corresponding to the sides of the flanks 7d, 7e.

At least one of the walls of the containing body 7 can comprise a net or mesh or in any case delimit a plurality of through holes constituting a plurality of inflow openings 9a, if desired in a substantially uniform manner for the entire extension of the walls. Preferably, at least the bottom wall 7a and the main walls 7b, 7c delimit a plurality of through holes 9a.

One or more of the walls of the containing body 7 and/or of the opening/closing component 8, if desired the bottom wall 7a, the main walls 7b, 7c and the flanks 7d, 7e of the containing body 7 and, if provided, the bridge connection wall 8c of the opening/closing component 8 can also have an internal face that is not flat or is bulged or is corrugated or in any case with grooved sections and projecting sections so as to delimit substantially concave zones with concavity directed towards the housing and containing zone RCZ, alternated with substantially convex zones with complexity direct towards the housing and containing zone RCZ. Such expedient ensures that the products or foods are not attached to the walls or nets of the containing body, so as to obtain a very uniform cooling.

In addition, the opening/closing component 8 and the containing body 7 are mutually movable between at least one first position of closure of the housing and containing zone RCZ, in which the opening/closing component 8 is arranged in a manner such to maintain the products to be cooked within the housing and containing zone RCZ even during the pivoting or the angular displacement of the containing body 7 and it prevents the exit thereof, and at least one second position of opening of the housing and containing zone, in which the opening/closing component 8 is arranged in a manner such to not prevent the pick-up or the placement of cooked products or of products to be cooked from or within the housing and containing zone RCZ.

According to the non-limiting embodiment illustrated in the figures, the opening/closing component 8 comprises a case component, for example engageable with the pivot or angular displacement means 5a, 5b and delimiting at least one insertion space or tunnel IS for the containing body 7; the containing body 7 is removably engageable within the insertion space IS.

The case component 8 can have two sides 8a, 8b and bridge connection means 8c, 8d of the sides 8a, 8b defining the insertion space or tunnel IS therebetween for the insertion and constraint of the containing body 7. On such matter, the sides 8a, 8b are at a greater distance, e.g. slightly greater than the width of the containing body 7 or the distance between the flanks 7d, 7e of the containing body 7.

If desired, the case component 8 also comprises a rear fence component 8e of the insertion tunnel IS, e.g. a rod or a wall projecting upward from a section of the edge, rear during use, of a side 8a to a section of the edge, rear during use, of the other side 8b and set to intercept, at the rear part, the insertion tunnel and thus prevent the exit of the containing body 7 upon insertion inside the tunnel IS starting from a front end, front during use or in rest condition.

The bridge connection means 8c, 8d can include first bridge connection means 8c of an upper edge, upper in rest condition, of the sides 8a, 8b and second bridge connection means 8d of the lower edge, lower in rest condition, of the sides 8a, 8b.

The first bridge connection means 8c and/or second bridge connection means 8d can include one or more rod elements 8d or a wall 8d, for example with net or mesh or in any case delimiting a plurality of through holes constituting a plurality of inflow openings 9b, if desired in a substantially uniform manner for the entire extension of the wall 8c.

The distance between the first bridge connection means 8c and the second bridge connection means 8d defines the height of the tunnel IS which is greater, e.g. slightly greater than the height of the containing body 7 or the distance between the bottom wall 7a and the free edge of the perimeter walls 7b-7e.

The sides 8a, 8b can include plates, if desired with L-shaped ends 8a1, 8b1 at the second bridge connection means 8d, and such L-shaped ends constitute a sliding zone for the containing body 7. The sides 8a, 8b could also be perforated, so as to allow the passage of air.

In addition, the case component 8 could also be set to house—simultaneously or at different times in the respective tunnel IS—containing bodies 7 of different size or depth or, if desired, both one or more containing bodies 7 and a pan or the like, such that the oven can be used both for cooking with a basket assembly and for cooking products in a pan.

On such matter, the length of the L-shaped ends 8a1, 8b1 of the sides 8a, 8b is, preferably, greater than or equal to the length of the containing body or of the distance between the main walls 7b, 7c, in particular at the end that is the lower end in rest condition.

According to the non-limiting embodiment illustrated in the figures, starting from the sides 8a, 8b and outside the tunnel, protuberances or projections 8f, 8g, e.g. annular, are extended that are set to engage or be connected or fixed or coupled, e.g. snap-coupled, fitted or coupled by screwing to the pivot or angular displacement means 5a, 5b.

As an alternative to that described in detail above, the opening/closing component 8 could comprise a wing component (not illustrated in the figures) pivoted at the free edge of the perimeter walls 7b-7e and constrainable thereto so as to open or close the housing and containing zone RCZ.

In such case, starting from the flanks 7d, 7e and outside the housing and containing zone RCZ, protuberances or projections would be extended that are set to engage or be connected or snap-fixed, fitted or by screwing (e.g. via screw-nut engagement) to the pivot or angular displacement means 5a, 5b.

The oven can have means 10a, 10b for locking the containing body 7 with respect to the opening/closing component 8 in the first position.

Advantageously, the locking means 10a, 10b comprise at least one pin or bolt 10a connected to or integral with the containing body 7 or with the case component 8 as well as a coupling hole or opening 10c, if desired delimited by an eyelet component 10b connected or fixed or integral with the other from among the case component 8 and the containing body 7, and such pin or bolt 10a can be removably coupled in a coupling hole or opening 10c.

According to the non-limiting embodiment illustrated in the figures, two pin or bolt components 10a are provided for, each slidably mounted at a respective side of the front or frontal wall 7b and set to engage or be constrained in a hole or opening 10c delimited by a side 8a, 8b or by an eyelet component 10b of a side 8a, 8b.

The case body 8 could be set to contain, during use, a plurality of containing bodies, or two case components could be provided, each for positioning a respective containing body. Due to such expedient, it would be possible to cook at half load or to cook two different products at the same time, among other things preventing the problems of mixing different products.

The basket assembly 4 can then also be provided with an extraction handle 13, if desired integral with or fixed or connected to the containing body 7, if desired to the frontal wall 7b thereof.

Preferably, the oven 1 comprises an electronic control unit (not illustrated in the figures) for controlling and/or actuating the components of the oven.

If desired, the oven comprises sensor means set to communicate with the control unit for the detection of at least one position of pivoting or of angular displacement of the containing body 7. For such purpose, a cam component can be provided, if desired with microswitch integral (for example) with the shaft of the motor or with means for pivoting or angular displacement 5a, 5b, and such microswitch is activated, if desired by contact, when the basket assembly 4 is in a specific position, e.g. the rest position.

In the electronic control unit, it is possible to save and select different cooking programs each time, so as to adjust the cooking to each type of food, for example by varying the cooking time or the rotation interval and stop or pause interval for the rotation of the basket assembly during cooking or the rotation speed of the basket assembly.

The oven can be provided with means for varying the cooking time or the rotation interval and stop or pause interval of the basket assembly or of the rotation speed of the basket assembly.

The oven 1 can then be provided with means for connecting with power supply means, e.g. electrical power supply means, if desired a plug EP or the like.

Clearly, the oven could also not comprise sensor means and a control unit as indicated above, but rather for example mechanical control means, e.g. one or more knobs for setting the end of cooking and/or a thermostat for controlling the temperature.

If desired, a button or switch could then also be provided in order to rotate the basket assembly 4 when desired, e.g. in order to bring it into the correct position for extraction.

In detail, with regard to the means 3 for introducing a hot fluid or air, as indicated above the same means can include a fan 3 mounted on the bottom of the cooking chamber CC, i.e. at a wall for delimiting the cooking chamber opposite the front door 2f.

The frame 2 can also define an internal space and have a dividing wall or baffle 11, e.g. vertical, mounted within such space, and such baffle delimits the cooking chamber CC with respective internal faces of the lateral walls 2c, 2d and of the front door 2f of the frame 2. More particularly, the baffle 11 is mounted at, for example a few centimeters away from, the internal surface of the rear wall 2e of the frame 2, so as to define an interspace with such surface.

Preferably, the fan is arranged within the interspace and can have a portion, for example central, for suction that is in fluid communication with the cooking chamber CC by means of at least one first mouth or inlet opening 11a delimited by the baffle 11, e.g. in a central position thereof and a portion, for example radial, for delivery in fluid communication with the cooking chamber CC by means of at least one second mouth or downflow opening 11b delimited by the baffle 11, e.g. at the top thereof.

Clearly, the oven could also not have a baffle.

In addition, the oven can then have a condensation unit 14 for the vapor produced in the cooking chamber CC as well as for collecting the fumes and the odors caused by the operation of the oven 1. For such purpose, the rear wall 2e of the frame 2 can delimit a channel for conveying the condensate with introduction opening 15 at an upper and rear zone of the cooking chamber CC and delivery opening in a condensation unit 14. For such purpose, the oven 1 can also have a component for guiding or introducing 16 the vapor within the introduction opening 15. According to the non-limiting embodiment illustrated in the figures, the introduction opening 15 is arranged alongside the fan 3 and in a position slightly higher with respect thereto.

Clearly, the oven 1 could also not comprise a condensation unit, and in such case an outlet for the vapors directly to the outside of the oven could be provided.

An oven 1 according to the present invention can then be provided with control panel 17 which can be complete with buttons for setting the parameters or cooking programs or actuation programs 18 for the components, e.g. the introduction means 3 and the operating means 6, display for displaying the cooking temperature, the cooking time or other variables and/or insertion ports for USB keys or the like. Alternatively or additionally, the oven could be provided with knobs or the like for controlling the components or setting the parameters or programs for cooking or operating the oven.

The oven 1 can also comprise a pan 20 or the like mounted in the cooking chamber CC beneath the basket assembly 4 and set to collect the possible dirt that could fall from the products during cooking.

Figure 18:
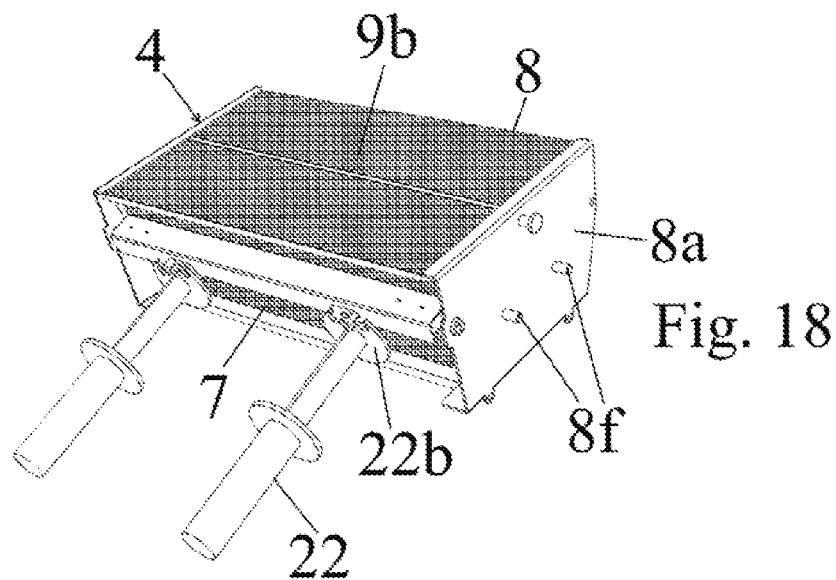
FIGS. 18 and 19 are perspective views of another basket assembly with tools for moving an oven according to the present invention.
Figure 19:
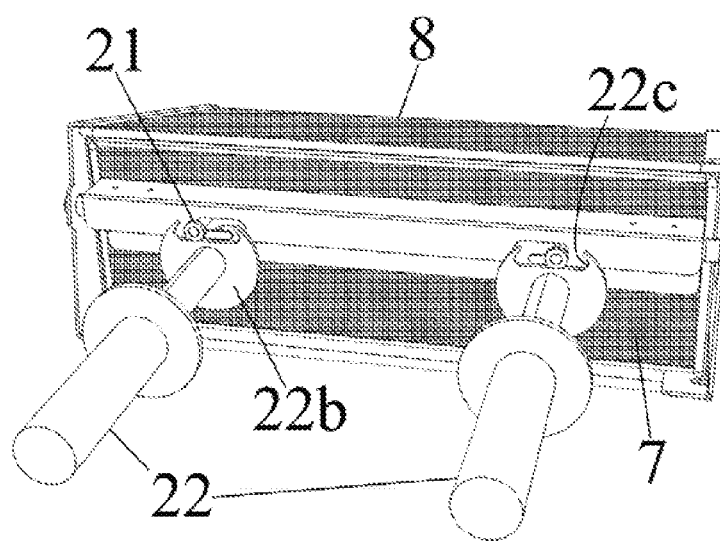
Figure 20:
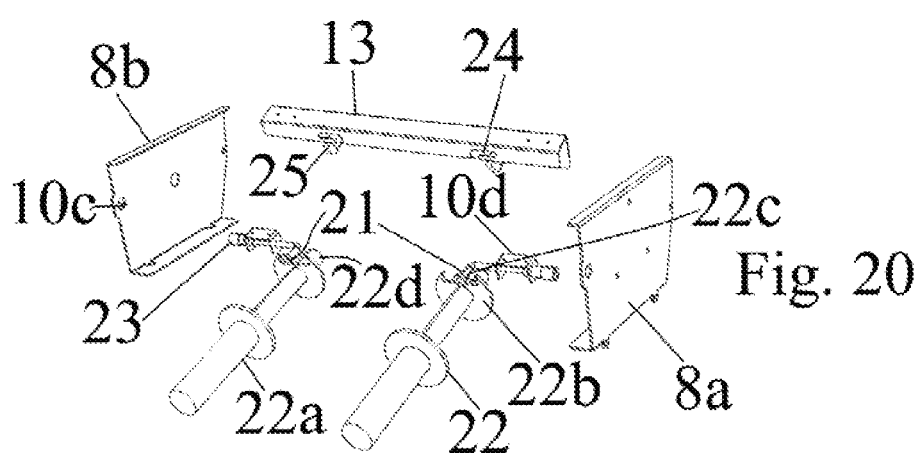
FIG. 20 illustrates some components of the elements of FIG. 18.

With reference now to FIGS. 18 to 20, another embodiment is illustrated of a basket assembly 4 for an oven according to the present invention, which is similar to that illustrated above but provided with means 21 for actuating the locking means 10a, 10b possibly engageable by means of suitable tools for movement or transport 22 of the basket assembly 4 or better yet of the containing body 7.

More particularly, the containing body 7 can have pins 21 for actuating the locking means 10a, 10b, which can be grasped so as to actuate or move the locking means 10a, 10b and disengage the containing body 7 from the opening/closing component 8, bringing it into the second position.

In such case, the locking means 10a, 10b can be elastically loaded, such that by pressing or pulling the actuation pins 21 opposing suitable elastic loading means (not illustrated in the figures) it is possible to move the locking means 10a, 10b as stated above, for example determining the exit of a pin 10a from a respective coupling opening or hole 10c.

On such matter, according to the non-limiting embodiment illustrated, one, two or more pins or bolts 10a are connected or slidably mounted with respect to the extraction handle 13, e.g. by means of a plate 10d, which can be fixed, e.g. screwed or glued, to the handle 13; more particularly, each pin or bolt 10a can be elastically loaded relative to the respective plate 10d. In addition, each pin or bolt 10a can comprise, on one side, an engagement end 23 of a respective coupling hole or opening 10c and on the other side it can be integral with, connected to or made of a single piece with an actuation pin 21. If desired, the unit comprising pin 10a, actuation pin 21 and engagement end 23 can be substantially configured as an L.

The extraction handle 13 can then delimit one or more guide slots 24, an actuation pin 21 being mounted in each of these; such slots 24 define the displacement path of the actuation pins 21 between the first and the second position. The guide slots 24 can be, at least for part of their extension, substantially straight and aligned in the direction from one side 8*a* to the other side 8*b* of the basket assembly 4, even if overall they can be configured as an L, with a section leading to one edge of the handle 13.

The oven can then also have one, two or more movement and transport tools 22 for the actuation means 21, e.g. each set to engage a respective actuation pin 21.

On such matter, each tool 22 can include a grip portion 22*a* and an engagement head 22*b* for the gripping means 21. The engagement head 22*b* can comprise a plate or disc component delimiting the thrust sections 22*c* for the gripping pins 21, such that when the pins 21 are engaged by the thrust sections 22*c*, by moving, for example rotating, the engagement head 22, a gripping pin 21 is consequently moved along a respective guide slot.

With regard to such aspect, the thrust sections 22*c* can be delimited by an edge portion of the engagement heads 2*b* configured as a hook. If desired, each engagement head 2*b* defines two thrust sections 22*c* configured as a hook or grapple, for example substantially aligned and one with concavity for housing a pin 21 directed in the direction opposite the other.

If desired, each movement or transport tool 22 can also have a push rod or sleeve for centering or positioning 22*d* with respect to the basket assembly 4, and such push rod or sleeve 22*d* is set to engage a respective shank or block 25 projecting from the basket assembly 4, if desired from a respective portion of the extraction handle 13. For such purpose, a push rod could be provided that is set to be fitted in a shank or a sleeve 22*d* set to enclose a block 25.

With one such structure, once the cooking of products by means of a basket assembly 4 has terminated, the operator, after having opened the front door 2*f* could disengage the containing body 7 from the opening/closing component 8 and extract it from the cooking chamber CC by acting manually or by means of the tools 22 on the actuation pins 21, moving the locking means 10*a*, 10*b*. Due to the tools 22, the operator can prevent being burned at the time of extraction of the basket assembly 4 or better yet of the containing body 7 from the cooking chamber CC.

As can be understood, with an oven according to the present invention, when it is necessary to cook products the same are arranged in a containing body 7, which is then arranged within the cooking chamber in engagement with the pivot or angular displacement means 5*a*, 5*b*, hence in the first position.

Moreover, if the basket assembly 4 comprises a case component 8, this can always be left in engagement with the pivot or angular displacement means 5*a*, 5*b*, and before the step just described, the containing body 7 is inserted in the insertion space IS delimited by the case component 8 and then the containing body 7 is locked by means of the locking means 10 in such insertion space IS. If instead the opening/closing component 8 comprises a wing component, then before or after the insertion of the containing body 7 in the cooking chamber, the wing component is closed and locked in position. The containing body 7 in such case must be engaged with the pivot or angular displacement means 5*a*, 5*b*.

At this point, once the cooking chamber CC is closed, for example by means of the front door 2*f*, the introduction means 3 and the operating means 6 are activated, if desired by operating on suitable buttons or by means of remote control, so as to determine the rotation or the angular displacement of the basket assembly 4 and the delivery of hot fluid or air in the cooking chamber CC, thus cooking the products in the basket assembly 4.

At the end of cooking or of the time preset for the cooking, the rotation/angular displacement of the basket assembly 4 is manually or automatically interrupted and the introduction means 3 are locked, and then the containing body 7 (or a containing body 7) is extracted with the cooked products, hence bringing it into a second position, in order to then once again introduce the containing body 7 or another containing body with products to be cooked into the cooking chamber and in engagement with the pivot or angular displacement means 5*a*, 5*b*, and a new cooking cycle is initiated.

An oven according to the present invention, with respect to a conventional oven, ensures a quicker cooking due in particular to a fluid or air circulation system, e.g. circulation from top to bottom, in combination with a rotation or angular displacement of the basket assembly, if desired with different speeds for different foods.

In addition, an oven in accordance with the present invention does not use cooking by immersion of the food in oil, so as to prevent using an element that is quite damaging for the health, without compromising the taste of the food or the quality of the cooking. On such matter, oil is a condiment that when subjected to cooking can put the consumer's health at risk, also due to the danger of burns, considering that by immersing a frozen food within oil, due to the water particles present on the food, a thermal shock is verified that generates a great quantity of splashes.

Moreover, oil is also a fatty food, hence an oven according to the present invention, which preferably allows cooking without oil, ensures a healthier and more dietetic cuisine.

In an oven according to the present invention, there is moreover no need to change the cooking oil, thus reducing the cooking costs.

According to the present invention, one also obtains the reduction of fumes and odors, since for cooking one uses the oil already present in the product remaining from the first frying, to which the same was subjected before being frozen.

It is also possible to obtain a uniform cooking of the food, both due to the rotation of the basket assembly and due to the possible bulging of the grids of the basket assembly. Such expedient decreases the risk that the product is attached to the walls of the basket assembly during cooking.

Another factor which contributes to obtaining a uniform cooking is the form with acute angles, if desired with trapezoidal or polygonal section of the containing body, which improves the mixing of the product during cooking.

With regard to the abovementioned prior art patent documents, and in particular U.S. Pat. No. 4,155,294A, the same regards an oven with a basket assembly having an external component and an internal component, both of which constituting part of the frame of the oven.

In substance, the oven of such US patent does not provide for means for the pivoting or angular displacement of a basket assembly within the cooking chamber, nor does it provide for a containing frame with a movable front door so as to allow the opening or sealing closure of the cooking chamber. According to U.S. Pat. No. 4,155,294A, rather, the basket assembly is only in part in the cooking chamber, while a part thereof delimits the cooking chamber and hence lies outside the same.

On such matter, an oven according to the present invention can be preheated before the insertion of the basket assembly in the cooking chamber, thus allowing the introduction of the products for cooking in an already-hot oven.

This clearly is not possible with the oven of U.S. Pat. No. 4,155,294A, since the respective basket assembly must be assembled before turning on the oven, since the same sealingly closes the cooking chamber.

Moreover, it is possible to make the front door of an oven according to the present invention so as to comprise one or a pair of panes or a double glazing, which ensures an optimal thermal insulation at such door.

In the solution taught by U.S. Pat. No. 4,155,294A, it is instead not possible to ensure a good insulation, considering the structure of the oven and above all of the respective basket assembly.

The double glazing in an oven according to the present invention also allows inspecting the products during cooking, while such aspect cannot be implemented according to the state of the prior art under examination.

The oven of the prior art document presently under examination also has safety problems, since the basket assembly that is driven in rotation is provided with a wall or better yet a closure wall unit projecting outward. As can be understood, the presence of one such rotatable and hot unit can compromise the safety of the operators.

In an oven according to the present invention, the rotatable basket assembly is instead entirely contained in the cooking chamber and does not project outside the oven itself.

The frontal walls of the basket assembly of U.S. Pat. No. 4,155,294A must also be sealingly closed in order to close the cooking chamber, while all the walls of the basket assembly of an oven according to the present invention can delimit through holes, thus ensuring an improved heat exchange with respect to the solution of the aforesaid US patent.

It is also observed that it is possible to remove the containing body of a basket assembly of an oven according to the present invention and use the opening/closing component 8 as support for pans, which is clearly not possible according to the solution of U.S. Pat. No. 4,155,294A.

Modifications and variations of the invention are possible within the protective scope defined by the claims.

The invention claimed is:

1. An oven for cooking products, particularly food, if desired for frying or cooking frozen products or fresh, breaded products, comprising:
   a containing shell or frame delimiting at least one cooking chamber,
   a fan for introducing a hot fluid or air into said at least one cooking chamber for heating and cooking products, wherein said fan is mounted on a rear wall of the at least one cooking chamber, the rear wall for delimiting the cooking chamber opposite a front door,
   at least one basket assembly for containing the products to be cooked,
   pivot or angular displacement means of said at least one basket assembly within said at least one cooking chamber,
   operating means designed to drag or allow the rotational or angular dragging of said at least one basket assembly engaged with said pivot or angular displacement means,
   said at least one basket assembly delimiting a housing of said at least one basket assembly and containing zone for products to be cooked, said at least one basket assembly being designed to maintain said products within said housing of said at least one basket assembly and containing zone during the pivoting or angular displacement of said at least one basket assembly by means of said operating means,
   wherein said containing frame has a door moveable so as to allow the opening or sealing closure of the cooking chamber, and
   wherein said at least one basket assembly comprises at least one containing body and at least one closing/opening component of said at least one containing body, which closing/opening component is designed to delimit, together with the containing body, said housing of said at least one basket assembly and containing zone for products to be cooked, wherein one or more of the walls of said containing body and/or of said opening/closing component has an inner face that is not flat or is bulged or is corrugated;
   further comprising an electronic control unit for controlling and/or operating the components of the oven, and comprising sensor means designed to communicate with said control unit for the detection of at least one pivot or angular displacement position of said at least one containing body.

2. The oven according to claim 1, wherein said at least one containing body is removably engageable with said pivot or angular displacement means, so as to be alternatively positionable:
   in at least one first position, wherein said at least one containing body is engaged with or by said pivot or angular displacement means and is arranged within said at least one cooking chamber for cooking said products, and
   in at least one second position, wherein said at least one containing body is disengaged from said pivot or angular displacement means and is arranged outside said at least one cooking chamber for loading said at least one containing body with products to be cooked and/or for emptying said at least one containing body of cooked products.

3. The oven according to claim 2, wherein said at least one containing body and/or said at least one closing/opening component delimit at least one inflow opening designed to allow the delivery, into said housing and containing zone, of a hot fluid or air introduced into said at least one cooking chamber by said introduction means.

4. The oven according to claim 2, wherein said at least one containing body and/or said at least one closing/opening component comprise at least one wall delimiting a plurality of inflow openings.

5. The oven according to claim 1, wherein said at least one containing body and said at least one closing/opening component are reciprocally movable between at least one first closing position of said housing and containing zone, wherein said at least one closing/opening component is arranged in such a way as to maintain the products to be cooked within said housing and containing zone even during pivoting or angular displacement of said at least one containing body and prevents the discharge thereof, and at least one second opening position of said housing and containing zone, wherein said at least one closing/opening component is arranged so as not to prevent the collection or placement of cooked products or products to be cooked from or into said housing and containing zone.

6. The oven according to claim 1, wherein said at least one closing/opening component comprises a case component delimiting at least one insertion space or tunnel for said at least one containing body, said at least one containing body being removably insertable into said at least one insertion space.

7. The oven according to claim 5, comprising locking means of said at least one containing body with respect to said closing/opening component in said first position.

8. The oven according to claim 6, comprising locking means of said at least one containing body with respect to said closing/opening component in said first position.

9. The oven according to claim 7, wherein said locking means comprise at least one pin or bolt connected to or integral with said at least one containing body or with at least one case component as well as a coupling hole or opening delimited by the other between said at least one case component and said at least one containing body, said at least one pin or bolt being removably fittable in a respective coupling hole or opening.

10. The oven according to claim 8, wherein said locking means comprise at least one pin or bolt connected to or integral with said at least one containing body or with said case component as well as a coupling hole or opening delimited by the other between said at least one case component and said at least one containing body, said at least one pin or bolt being removably fittable in a respective coupling hole or opening.

11. The oven according to claim 1, wherein said housing and containing zone has a cross section configured as a regular or irregular trapezoid or polygon and in such a way as to define one or more acute angles in said housing and containing zone.

12. The oven according to claim 1, wherein said at least one containing body has a back wall as well as one or a plurality of perimeter walls extending from said back wall so as to define a side or frame zone delimiting together with the back wall of said housing and containing zone, the free edge or the end or the end section of said one or said plurality of perimeter walls distal from said back wall defining a filling or emptying opening of said housing and containing zone.

13. The oven according to claim 6, wherein said case component has two side walls and bridge connection means of the side walls that define therebetween said insertion space or tunnel for the insertion and constraint of said containing body.

14. The oven according to claim 13, wherein said bridge connection means include first bridge connection means of an upper edge of the side walls and second bridge connection means of the lower edge of the side walls.

15. The oven according to claim 14, wherein said first bridge connection means and/or said second bridge connection means include one or more rod elements or a wall.

16. The oven according to claim 1, wherein said containing frame has a top wall, a base wall, lateral walls, a rear wall and the front door connected or hinged to the end of a lateral wall or of the top wall or of the base wall, said front door being movable so as to allow the opening and sealing closure of the cooking chamber.

17. The oven according to claim 1, wherein said pivot or angular displacement means comprise a first pin for the pivoting or the angular displacement drivable in rotation by means of the operating means and a second pin for the pivoting or the angular displacement supported fixed or rotatably idle by the frame inside the cooking chamber.

18. The oven according to claim 1, wherein said at least one containing body and said at least one closing/opening component are reciprocally movable between at least one first closing position of said housing and containing zone, wherein said at least one closing/opening component is arranged in such a way as to maintain the products to be cooked within said housing and containing zone even during pivoting or angular displacement of said at least one containing body and prevents the discharge thereof, and at least one second opening position of said housing and containing zone, wherein said at least one closing/opening component is arranged so as not to prevent the collection or placement of cooked products or products to be cooked from or into said housing and containing zone, wherein said oven comprises locking means of said at least one containing body with respect to said closing/opening component in said first position, and wherein said basket assembly is provided with pins for actuating the locking means engageable by means of tools for movement or transport of the basket assembly or of the containing body.

19. The oven according to claim 1, wherein said at least one closing/opening component comprises a case component delimiting at least one insertion space or tunnel for said at least one containing body, said at least one containing body being removably insertable into said at least one insertion space, wherein said oven comprises locking means of said at least one containing body with respect to said closing/opening component in said first position, and wherein said basket assembly is provided with pins for actuating the locking means engageable by means of tools for movement or transport of the basket assembly or of the containing body.

20. An oven for cooking products, particularly food, if desired for frying or cooking frozen products or fresh, breaded products, comprising:
   a containing shell or frame delimiting at least one cooking chamber,
   introduction means of a hot fluid or air into said at least one cooking chamber for heating and cooking products,
   at least one basket assembly for containing the products to be cooked,
   pivot or angular displacement means of said at least one basket assembly within said at least one cooking chamber,
   operating means designed to drag or allow the rotational or angular dragging of said at least one basket assembly engaged with said pivot or angular displacement means,
   said at least one basket assembly delimiting a housing of said at least one basket assembly and containing zone for products to be cooked, said at least one basket assembly being designed to maintain said products within said housing of said at least one basket assembly and containing zone during the pivoting or angular displacement of said at least one basket assembly by means of said operating means,
   wherein said containing frame has a door moveable so as to allow the opening or sealing closure of the cooking chamber, and
   wherein said at least one basket assembly comprises at least one containing body and at least one closing/opening component of said at least one containing body, which closing/opening component is designed to delimit, together with the containing body, said housing of said at least one basket assembly and containing zone for products to be cooked,
   comprising an electronic control unit for controlling and/or operating the components of the oven, and
   comprising sensor means designed to communicate with said control unit for the detection of at least one pivot or angular displacement position of said at least one containing body.

21. An oven for cooking products, particularly food, if desired for frying or cooking frozen products or fresh, breaded products, comprising:

a containing shell or frame delimiting at least one cooking chamber, a fan for introducing a hot fluid or air into said at least one cooking chamber for heating and cooking products, wherein said fan is mounted on a rear wall of the at least one cooking chamber, at a wall for delimiting the cooking chamber opposite a front door, at least one basket assembly for containing the products to be cooked, pivot or angular displacement means of said at least one basket assembly within said at least one cooking chamber, operating means designed to drag or allow the rotational or angular dragging of said at least one basket assembly engaged with said pivot or angular displacement means, said at least one basket assembly delimiting a housing of said at least one basket assembly and containing zone for products to be cooked, said at least one basket assembly being designed to maintain said products within said housing of said at least one basket assembly and containing zone during the pivoting or angular displacement of said at least one basket assembly by means of said operating means, wherein said containing frame has a door moveable so as to allow the opening or sealing closure of the cooking chamber, and wherein said at least one basket assembly comprises at least one containing body and at least one closing/opening component of said at least one containing body, which closing/opening component is designed to delimit, together with the containing body, said housing of said at least one basket assembly and containing zone for products to be cooked, wherein said at least one containing body and said at least one closing/opening component are reciprocally movable between at least one first closing position of said housing of said at least one basket assembly and containing zone, wherein said at least one closing/opening component is arranged in such a way as to maintain the products to be cooked within said housing of said at least one basket assembly and containing zone even during pivoting or angular displacement of said at least one containing body and prevents the discharge thereof, and at least one second opening position of said housing of said at least one basket assembly and containing zone, wherein said at least one closing/opening component is arranged so as not to prevent the collection or placement of cooked products or products to be cooked from or into said housing of said at least one basket assembly and containing zone, wherein said oven comprises locking means of said at least one containing body with respect to said closing/opening component in said first position, and wherein said basket assembly is provided with pins for actuating the locking means engageable by means of tools for movement or transport of the basket assembly or of the containing body.

* * * * *